(12) United States Patent
Ayling et al.

(10) Patent No.: US 6,276,250 B1
(45) Date of Patent: Aug. 21, 2001

(54) METHOD AND APPARATUS FOR SEPARATING A PIPE FROM A CABLE

(75) Inventors: John David Kenneth Ayling, Hull; Jeremy Nathaniel Nieto Raphael, London, both of (GB)

(73) Assignee: United Utilities PLC (GB)

( * ) Notice: Subject to any disclaimer, the term of this patent is extended or adjusted under 35 U.S.C. 154(b) by 0 days.

(21) Appl. No.: 09/381,670

(22) PCT Filed: Feb. 13, 1998

(86) PCT No.: PCT/GB98/00452

§ 371 Date: Sep. 9, 1999

§ 102(e) Date: Sep. 9, 1999

(87) PCT Pub. No.: WO98/40661

PCT Pub. Date: Sep. 17, 1998

(30) Foreign Application Priority Data

Mar. 12, 1997 (GB) .................................................. 9705058

(51) Int. Cl.[7] ....................................................... B26D 3/08

(52) U.S. Cl. ............................. 83/885; 29/403.3; 81/9.51; 83/873; 83/874; 83/425.2

(58) Field of Search .................................... 29/403.3, 825; 81/9.51; 83/107, 425, 425.2, 433, 872, 873, 874, 879, 880, 883, 886, 885

(56) References Cited

U.S. PATENT DOCUMENTS

| | | | |
|---|---|---|---|
| 2,046,341 | * | 7/1936 | McParlin .............................. 81/9.51 |
| 2,882,188 | * | 4/1959 | Levin et al. .......................... 81/9.51 |
| 3,309,947 | * | 3/1967 | Denney ................................. 81/9.51 |
| 3,462,052 | * | 8/1969 | Wagner ................................. 81/9.51 |
| 4,534,254 | * | 8/1985 | Budzich et al. ..................... 29/403.3 |

* cited by examiner

Primary Examiner—W. Donald Bray
(74) Attorney, Agent, or Firm—Michael Best & Friedrich L (57) ABSTRACT

A method of separating a pipe (1) from an elongate flexible element (2) used to pull the pipe (1) from the ground comprises drawing the flexible element (2) past or through separating means which splits the pipe (1) along its length as it passes to thereby strip the pipe (1) from the flexible element (2).

16 Claims, 5 Drawing Sheets

METHOD AND APPARATUS FOR SEPARATING A PIPE FROM A CABLE

The present invention relates to a method and apparatus for separating a pipe from a cable or the like used to pull the pipe from the ground.

In the past lead piping has been used extensively, particularly in water distribution systems. However, lead piping is no longer acceptable to such applications for health risk and environmental reasons. It has therefore become necessary to replace lead piping.

A variety of different methods and apparatus are known for extracting lead piping from the ground. In particular, it is known to pull piping from the ground using a cable or the like which is inserted into the pipe and which may be provided with gripping means along its length which distribute the pulling force over the length of the pipe or may be fitted with a device which imparts the pulling force to one end of the pipe. Examples of such pipe extraction apparatus are described in British patent application no. 9422919 (publication no. 2285297).

Inevitably such apparatus can become so firmly jammed in a pipe that its removal therefrom can be difficult if not impossible. Thus, the pipe removal apparatus often has to be discarded along with the pipe after use.

It is an object of the present invention to obviate or mitigate the above problem.

According to a first aspect of the present invention there is provided a method of separating a pipe from an elongate flexible element used to pull the pipe from the ground, the method comprising drawing the flexible element past separating means which splits the pipe along its length as it passes to thereby strip the pipe from the flexible element.

The flexible element may be a cable or the like fitted with gripping means as mentioned above. The present invention thus provides a way of removing the cable e.t.c. from a pipe so that it does not need to be discarded but rather can be re-used.

The method may include the step of scoring the pipe along its length and splitting the pipe along one or more score lines to strip the pipe from the flexible element.

Since the wall thickness of any given pipe may not be uniform along its length, an incision intended to score the pipe may actually cut through the pipe wall in places and this possibility is intended to be covered by the term "score". The term "score" is thus to be interpreted accordingly throughout this specification.

Any suitable means could be used to score the pipe and more than one score line may be made along the length or the pipe. Similarly, a variety of different means could be used to strip the weakened pipe from the flexible element.

The method can be performed at the site at which the pipe is extracted from the ground. This would allow immediate re-use of the cable e.t.c. to extract another pipe. Alternatively, piping extracted from the ground could be transported off site to a central location at which the method is performed to recover the cable e.t.c.

Preferably a winch is used to draw the pipe past the separating means and the pipe is stripped from the flexible element upstream of the winch so that only the flexible element reaches the winch.

In one preferred manner of performing the invention in which the pipe is separated from the flexible element on site as it is pulled from the ground, the winch provides the means for pulling the flexible element and pipe from the ground.

The pipe may emerge from the ground into an excavation. The winch may, however, be situated above ground level and the pipe re-directed out of the excavation to the location of the winch.

Any scoring operation may be performed within the excavation, before the pipe is directed to the winch, or alternately after the pipe has been directed towards the winch. In the latter case the pipe may be scored at or above ground level to permit ready monitoring of the operation.

A wheel or roller may be provided in the excavation to direct the flexible element/pipe towards the winch, the direction of the pipe changing as it is pulled around a part of the circumference of the wheel/roller by the winch/flexible element. The roller/wheel diameter is preferably maximised to reduce deformation of the pipe and is preferably profiled to match the diameter of the pipe.

The wheel/roller may be provided with a scoring edge around its circumference (e.g. a circumferential blade) to score the pipe as it passes around the wheel/roller.

As mentioned above, the method according to the present invention may be performed away from the site at which a pipe is removed from the ground. For instance the pipe/flexible element composite may be coiled onto a winch drum or the like at the pipe removal site and then transported to a central pipe/flexible element separation site.

Thus, in one manner of performing the invention the flexible element/pipe is drawn from a drum or roller (for instance a winch drum onto which the pipe/flexible element has been wound at the pipe removal site) by a winch and the stripping (and any scoring) operations are performed as the flexible element/pipe passes from the drum/roller to the winch. Alternatively a scoring operation may be performed at the pipe removal site before the pipe/flexible element is taken to the pipe/flexible element separation site, in which case only the stripping operation need be performed at the pipe/flexible element is passed from the drum/roller to the winch.

When performing the method in the manner described in the above paragraph, the pipe is preferably straightened prior to the scoring and/or stripping operation.

When performing the method at the site of removal of the pipe from the ground, the flexible element may be pulled by a winch from another winch which is actually used to pull the flexible element/pipe from the ground. For instance, where the pipe emerges from the ground into an excavation a winch may be situated within the excavation and operated as a capstan feeding the flexible element/pipe to a second winch which is situated above ground level. Scoring and splitting operations may be performed between the two winches.

As mentioned above, the operation of splitting the pipe from the flexible element may be performed in a variety of ways. For instance, in one preferred manner of performing the invention, the splitting operation is performed by pulling the flexible element past a splitter member which bears against the internal wall of the pipe and forces the pipe in a direction away from the flexible element thereby causing the pipe to split. The splitter member preferably has portions on diametrically opposite sides of the flexible element so that opposite sides of the pipe are forced in opposite directions. For example, the splitter member may be a tapered member (e.g. a cone) through which the flexible element is pulled so that the pipe passes over the outside of the splitter member and is thereby forced to split apart so that it falls away from the flexible element.

The splitter member may be provided with one or more blades to cut the pipe wall. In this case it may not be necessary to first score the pipe before splitting it from the flexible element.

Alternatively, the splitting operation may be performed simply by pulling the pipe at an angle to the flexible element so that the flexible element breaks through the weakened pipe wall.

As mentioned above, any suitable means could be used to score the pipe. For instance, a pair of knife edge wheels may be used to score the pipe at diametrically opposed positions. Such wheels may preferably be supported by a mounting which is itself substantially fixed in position but which supports the wheels with freedom of translational movement to accommodate transverse deviation in motion of the pipe.

The wheels may be powered to rotate with a tangential speed greater than the speed of travel of the pipe.

In all the above described ways of performing the invention the pipe may be scored along its length (although this might unavoidably lead to the pipe being cut in places as a result of irregularities in the thickness of the pipe wall). This is advantageous as it reduces the risk of damage to the flexible element and any pipe gripping means that may carry. However, in some cases it might be acceptable, and even desirable, to deliberately cut through the pipe wall along its length, and thus the method may be performed accordingly. For instance, as mentioned above, in some cases it may be desirable not to score the pipe at all, but rather to pass the flexible element directly through a splitter member fitted with a number of blades to cut through the pipe wall.

The method according to the present invention is particularly adapted, but is not restricted, to use in relation to lead pipes.

According to a second aspect of the present invention there is provided apparatus for separating a pipe from an elongate flexible element used to pull the pipe from the ground, the apparatus comprising a winch, and separating means located upstream of the winch to split the pipe along its length as it travels towards the winch and separate it from the flexible element so that only the flexible element is reaches the winch.

The separating means may include scoring means for scoring the pipe along its length, and splitting means for splitting the pipe along the or each score line.

The separating means may comprise a splitter member fitted with at least one blade to cut the pipe along its length.

Specific embodiments of the present invention will now be described, by way of example only, with reference to the accompanying drawings, in which.

Figures 1, 1A:
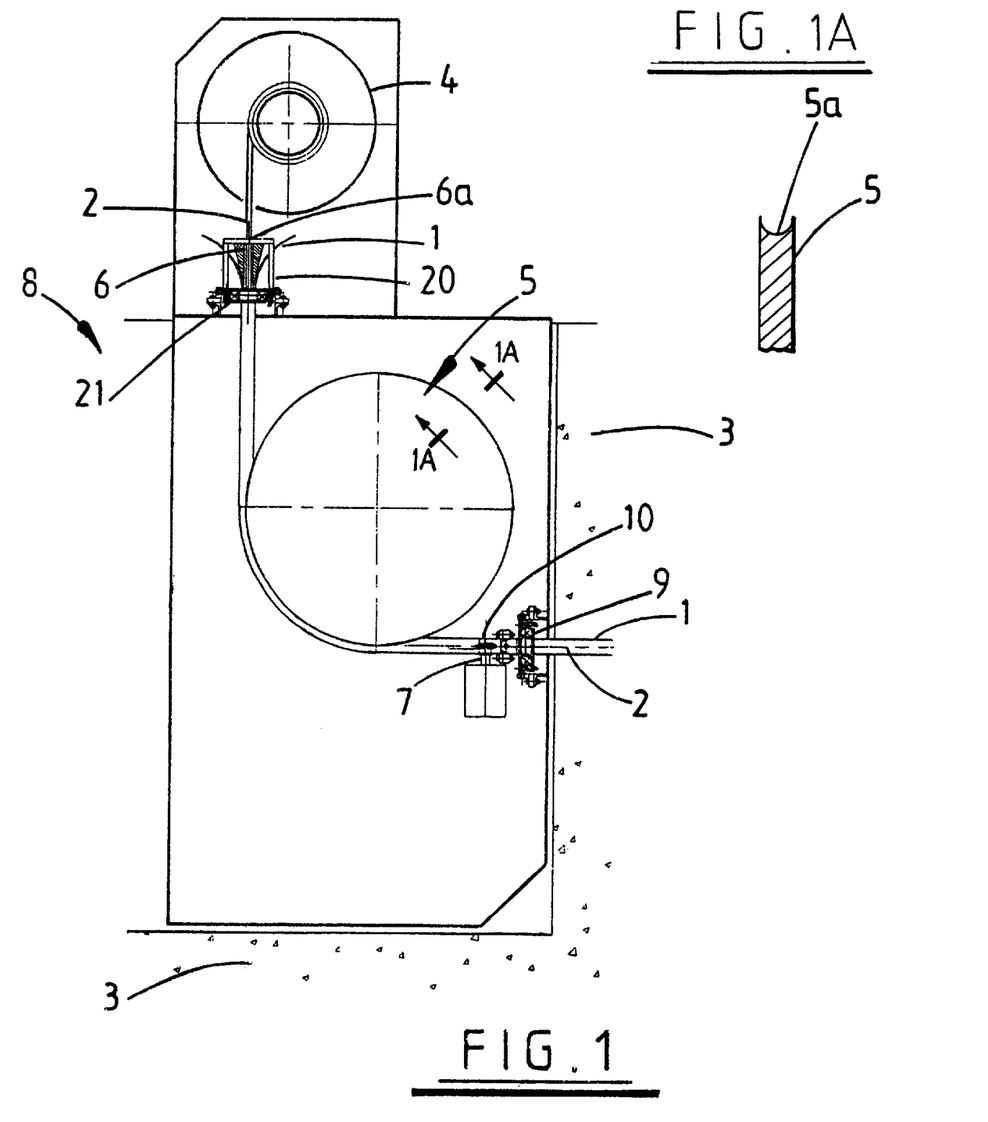
FIG. 1 is a schematic illustration of apparatus in accordance with a first embodiment of the present invention.
FIG. 1A is a section view of the wheel component.

Referring to FIG. 1, this illustrates apparatus for performing a method in accordance with the present invention for separating a lead pipe 1 from a steel cable 2 which is used to extract the pipe from the ground 3. With this apparatus the pipe 1 is separated from the cable 2 at the site of extraction of the pipe 1 from the ground 3, in a manner described below. It will be understood that the cable 2 may be fitted with gripping means which are not shown but which are used to engage the pipe 1 so that it may be pulled from the ground 3.

The illustrated apparatus essentially comprises a hydraulic winch 4, a guide wheel 5 at splitter cone 6 and a scoring mechanism 7. The wheel 5 is mounted within an excavation 8 which is dug to allow access to the end of the pipe 1. The pipe 1 is extracted from the ground 3 by winding the cable 2 onto the hydraulic winch 4 which is located above ground level. The pipe 1 and cable 2 are directed to the hydraulic winch 4 by the guide wheel 5, i.e. the pipe 1 and cable 2 are pulled around a portion of the circumference of the wheel after emerging from the ground 3. It is advantageous to provide the wheel 5 with a large circumference to avoid deforming the pipe 2. In addition, as shown in FIG. 1A, the rim 5a of the wheel may be profiled to match the diameter of pipe 1.

A guide bush 9 is mounted adjacent the wall of the excavation 8 where the pipe 1 emerges from the ground 3, to guide the pipe 1 to the scoring device 7. The scoring device 7, which is illustrated in detail in FIG. 2, comprises two knife-edge wheels 10 (which are horizontally disposed in the arrangement of FIG. 1) which score the pipe wall as the pipe 1 is pulled from the ground 3. That is, the pipe 1 passes through an aperture 11 in the scoring device 7 so that the wheels 10 bear against diametrically opposed locations on the surface of the pipe wall. The wheels 10 are rotated (for instance by hydraulic motors) at a greater speed than the extraction speed of the pipe 1, and are biased against the pipe 1 by respective coil springs 12 (although alternative, e.g. hydraulic, biasing means could be used).

Figures 2, 2A:
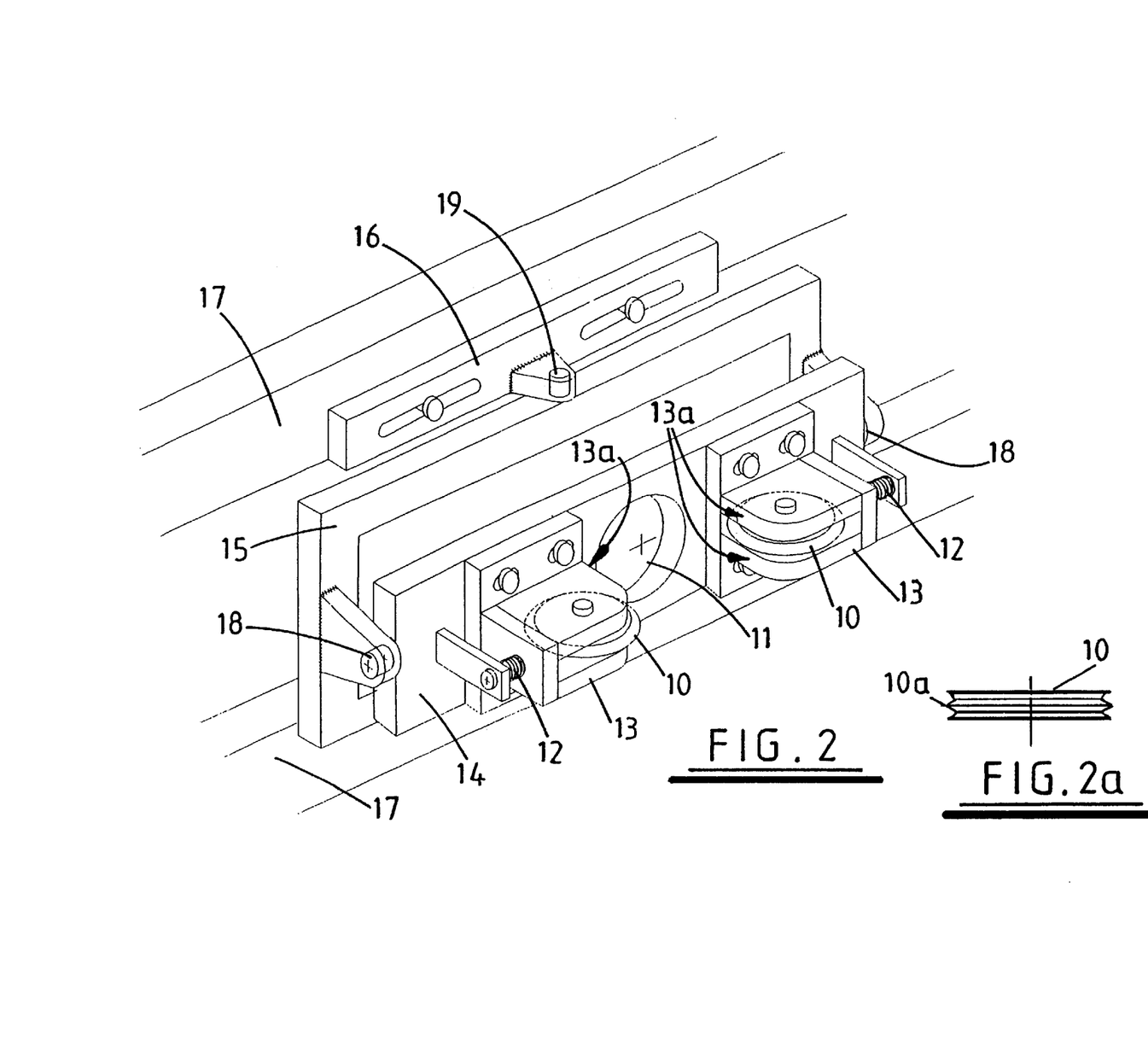
FIG. 2 is a perspective illustration of a part of the apparatus of FIG. 1.
FIG. 2a illustrates a modified component of the apparatus illustrated in FIG. 2.

The wheels 10 are rotatably mounted within respective brackets 13 which have abutment shoulders 13a which limit the depth to which the wheels 10 cut into the walls of the pipe 1. In this way the depth of the scoring incision can be controlled. The wheel brackets are supported on a rectangular support plate 14 which is pivotably mounted (at each of its ends) to an intermediate support frame 15. The support frame 15 is itself pivotably supported on sliding mounts 16 (only one of which is shown in FIG. 2) which are located on support rails 17.

The pivots 18 between the support plate 14 and support frame 15 are orthogonal to the pivots 19 between the support frame 15 and the sliding mounts 16. The overall mounting arrangement is such that the wheels 10 can move both horizontally and vertically to cater for the lay of the pipe on the wheel 5 (or alternatively on a winch drum as is the case in alternative embodiments described below), and can also pivot to accommodate the fleet angle of the pipe 1.

Returning now to FIG. 1, it will be seen that the scoring device 7 is arranged to make two diametrically opposed (in the horizontal direction) score lines along the length of the pipe 1 as it emerges from the ground 3 and travels to the guide wheel 5. This weakens the pipe wall enabling the pipe 1 to be separated from the cable 2 by the splitter cone 6 in the manner described below.

The splitter cone 6 is mounted at ground level by a support frame 20 which is provided with a guide bush 21 which guides the pipe 1 to the cone 6. The cone 6, frame 20 and bush 21 are supported by a "floating" mounting (not illustrated) so that it can move to accommodate the lay of the cable 2 on the winch 4.

The splitter cone 6 has a central bore 6a through which the cable 2 passes to the winch 4. The pipe 1, however, passes over the out side surface of the cone 6. As the pipe 1 is pulled over the splitter cone 6, from its narrow front end to its wider rear end, it is split along the score lines and thus stripped away from the cable 2. The pipe 1 can then be cut manually (for instance using bolt cutters) into manageable lengths as it peels away from the cable 2.

The diameter of the narrow end of the cone 6 is preferably slightly larger than the bore of the pipe 1 to avoid damaging any gripping means located on the cable 2 (the leading edge of the pipe 1 may therefore need to be manually split, or enlarged, so that it can be initially located over the cone 6). In addition, it would be preferably to provide the cone 6 in two halves (mounted within a suitable housing) to enable quick release of the cone should problems develop in the splitting operation.

Thus, in summary, it will be seen that according to this first embodiment of the present invention, the pipe 1 is pulled from the ground 3 within an excavation 8.

The winch 4 is, however, advantageously located above ground level, the pipe 1 being redirected to the winch 4 by the guide wheel 5. As the pipe 1 emerges from the ground it is scored along its length by the wheels 10 of the scoring mechanism 7 before passing to the guide wheel 5. From the guide wheel 5 the cable 2 and pipe 1 are fed to a splitter cone 6 which strips the pipe 1 away from the cable 2 which is then wound onto the winch 4 ready for re-use.

As modification to the above apparatus the scoring wheels 10 could be profiled as illustrated in FIG. 2a. Here the circumferential edge of the modified wheel 10 is "grooved" to match the curvature of the pipe and is fitted with a circumferential blade 10a to score the pipe.

Alternatively the guide wheel 5 could be fitted with a circumferential blade to score the pipe 1, and the scoring wheels 10 omitted entirely.

Although the important features of this embodiment of the invention have been described above, other features, such as the way in which the various components are supported relative to the excavation 8, have not been described in detail since the skilled man will readily be able to provide appropriate support arrangements depending on the particular site requirements. This is also true of the further embodiments described below, where features common to the above described embodiment are given like reference numerals.

Figure 3:
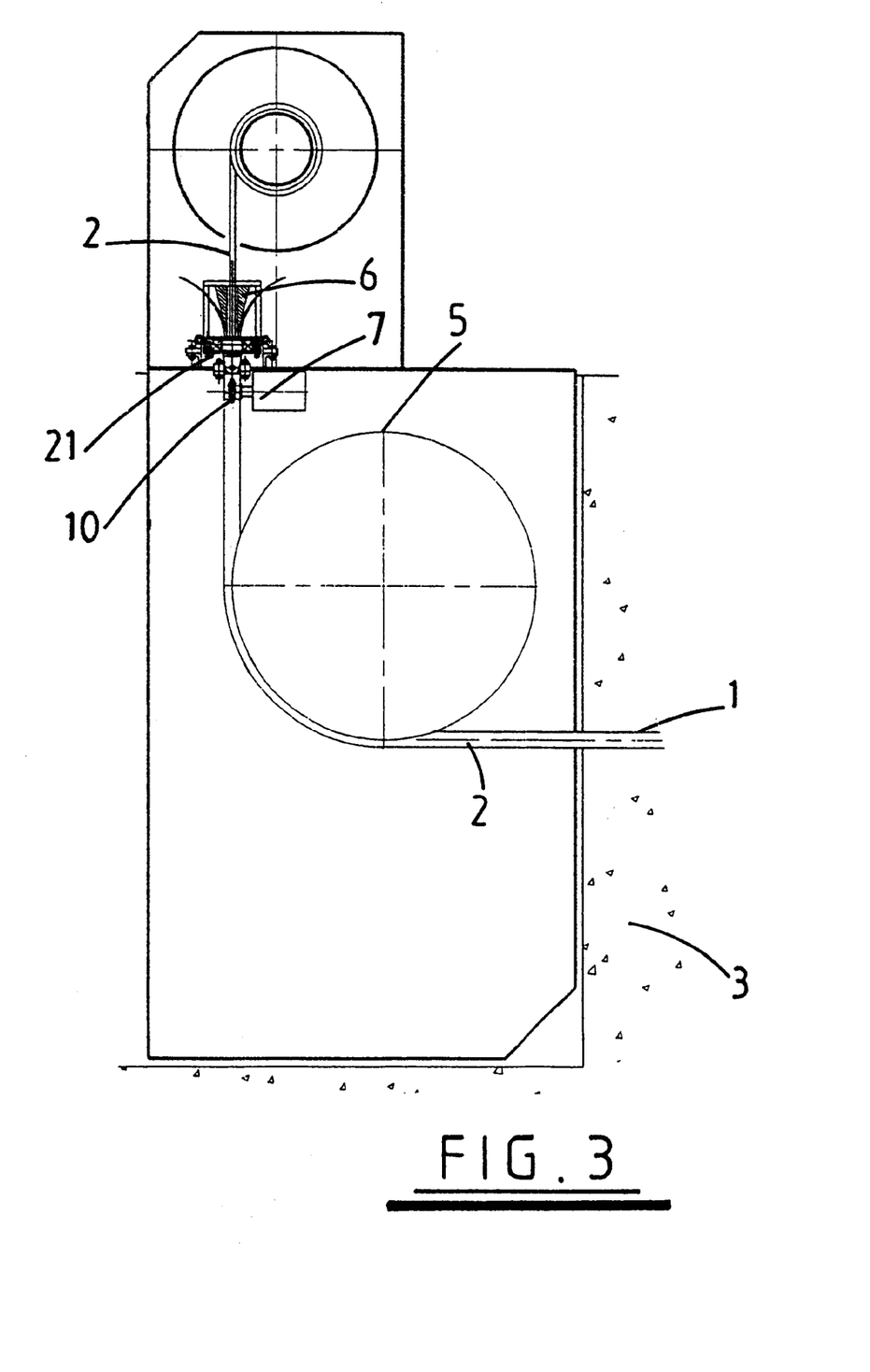
FIG. 3 illustrates a modification of the apparatus of FIG. 1.

Referring now to FIG. 3, this is a simple modification of the apparatus of FIG. 1 in which the scoring mechanism 7 is mounted at ground level just below the splitter cone 6, rather than within the excavation 8 where the pipe 1 emerges from the ground as is the case in the arrangement of FIG. 1 (the guide bush 10 is thus redundant). With this arrangement the scoring operation is also performed in an easy access area so that it can more readily be monitored and controlled. Alternatively, the guide wheel 5 could be dispensed with and the rest of the assembly located within the excavation.

Figure 4:
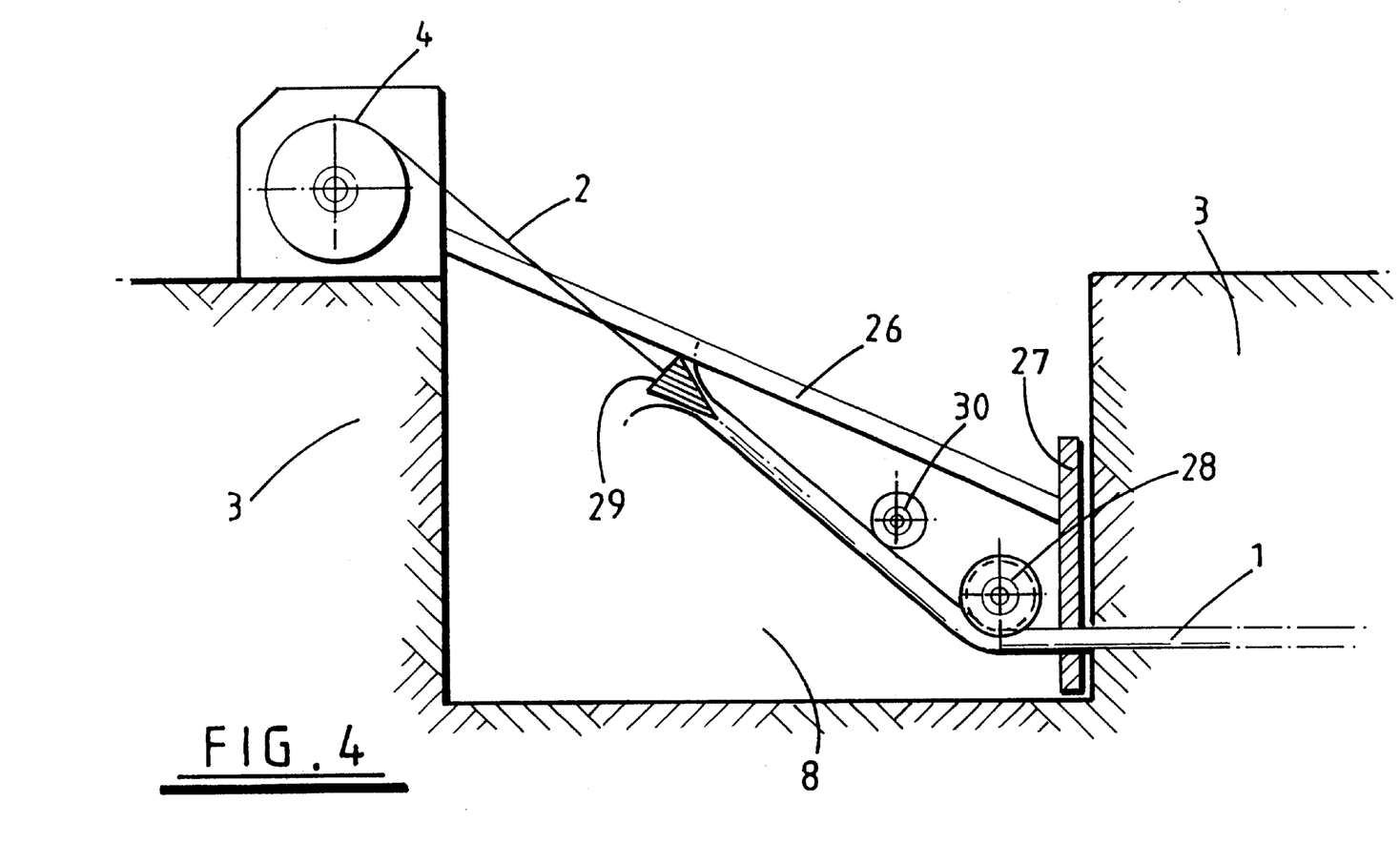
FIG. 4 illustrates apparatus in accordance with a third embodiment of the present invention.

FIG. 4 schematically illustrates a further embodiment of the invention in which the winch 4 is located at ground level next to the excavation 8. In this arrangement the winch 4 is supported by a support arm 26 which extends between the winch 4 and a pressure plate 27 which bears against a wall of the excavation 8 where the pipe 1 emerges from the ground 3.

As the pipe 1 emerges from the ground 3 it passes around a guide wheel 28 before being stripped from the cable 2 by a splitter cone 29 located just within the excavation 8. A scoring wheel 30, which may preferably have the profile illustrated in FIG. 2a, may be mounted between the guide wheel 28 and the splitter cone 29 to score the pipe 1 as it passes. The splitter cone 29 is preferably mounted for translational movement so that it can be brought into and out of contact with the pipe 1.

It will be appreciated that many of the features of the arrangements illustrated in FIGS. 1 and 3 could be included in the arrangement illustrated in FIG. 4. For instance, if the winch 4 is a bobbin type winch, the splitter cone 29 can be mounted on a floating mount to accommodate movement of the pipe as it lays on the bobbin. Alternatively, if the winch 4 is a capstan type winch, such a floating mount would not be necessary. Other modifications that could be made include replacement of the guide wheel 28 and scoring wheel 30 with a single wheel, profiled as illustrated in FIG. 2a, which both guides and scores the pipe 1 at the same time. Alternatively, the single scoring wheel 30 could be supplemented with a second scoring wheel positioned diametrically opposite the first scoring wheel to score the pipe along two lines.

The apparatus of FIGS. 1 to 4 are designed so the invention can be worked at the pipe extraction site. The method according to the present invention could also be performed entirely away from the site of the pipe extraction using apparatus such as is illustrated in FIGS. 5 and 6 described below.

Figure 5:
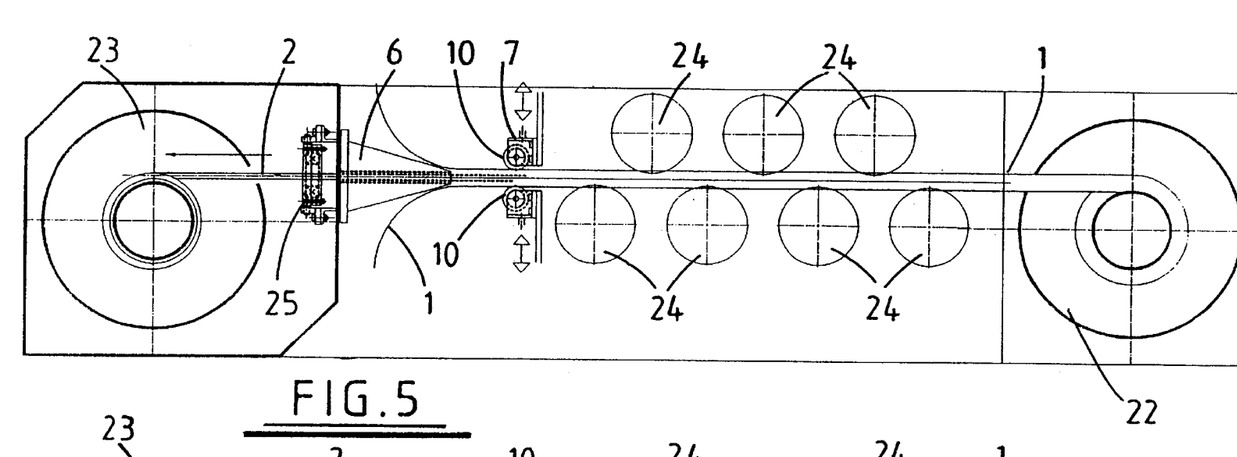
FIG. 5 is a schematic illustration of an apparatus in accordance with a fourth embodiment of the present invention.
Figure 6:
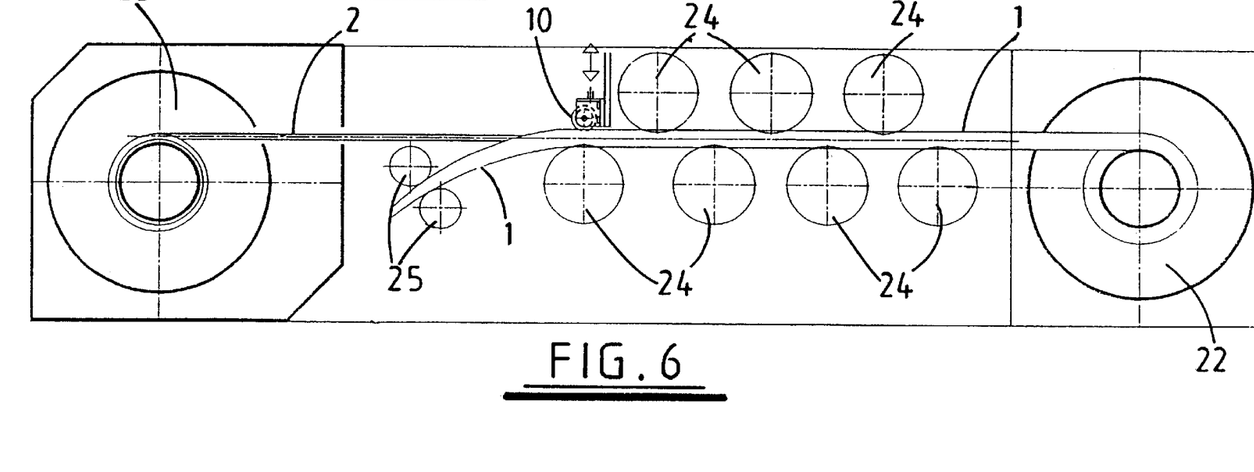
FIG. 6 illustrates a modification of the apparatus of FIG. 5.

FIG. 5 illustrates pipe stripping apparatus for stripping away a pipe 1 from a cable 2, the pipe 1 and cable 2 having previously been wound (without having first been scored) onto a winch drum 22 at the pipe extraction site. The apparatus comprises at one end a rotatable mounting (not illustrated) for the winch drum 22 and at its opposite end a winch 23. The winch 23 is used to pull the cable 2 and pipe 1 from the winch drum 22, although, as described below, only the cable 2 is actually wound onto the winch 23, the pipe 1 being stripped away.

Between the winch drum 22 and the winch 23 the apparatus is provided with a series of profiled pipe straightening wheels 24, a scoring mechanism 7 and a splitter cone 6. As the pipe 1 is pulled uncoiled from the winch drum 22 it is substantially straightened by the wheels 24 before passing to the scoring mechanism 7 which has a pair of wheels 10 that score the pipe 1 along its length. The scoring mechanism may be substantially the same as that described above or may be modified. The scoring wheels 10 are, however, preferably provided with a "floating" mounting so that they can follow the profile of the pipe 1 which may not be quite straight.

From the scoring mechanism 7 the cable/pipe passes to a splitter cone 6 which peels the pipe 1 away from the cable 2 in the manner described above (except in this case the splitter cone assembly is provided with a guide bush 25 located behind the cone). The cable 2 is thus separated from the pipe 1 and coiled onto the winch 23 ready for re-use.

If necessary the apparatus could be provided with centralising means (e.g. pairs of opposed rollers, one in the vertical plane and one pair in the horizontal plane) to help centralise the pipe 1 onto the splitter cone 6.

A modification of the pipe stripping apparatus shown in FIG. 5 is illustrated in FIG. 6. In this arrangement the scoring mechanism comprises only a single scoring wheel 10, which opposes a profiled guide/straightening wheel 24a and cuts a score line into the top of the pipe 1 (i.e. above the cable 2). In addition, rather than the stripper cone 6, the apparatus is provided with a pair of powered gripper rollers 25 positioned below the cable 2 downstream of the scoring mechanism. The gripper rollers 25 grip the pipe 1 and pull it downwards away from the cable 2 so that the cable tears through the pipe wall along the score line as it is wound onto the winch 23. This apparatus can readily accommodate varying degrees of ovally in the pipe.

It will be appreciated that the apparatus of FIGS. 5 and 6 could also be used in connection with piping which has previously been scored at the pipe extraction site. For instance piping which is extracted, scored, and wound onto a winch drum in the manner described above in relation to FIG. 4, could be separated from the cable 2 using the apparatus of FIGS. 5 and 6. In this case the additional scoring means provided by the apparatus could be dispensed with.

It will be understood that performance of the method according to the present invention is not limited to the exact procedures described above, or to the particular apparatus described. For instance, rather than the arrangements described above in relation to FIGS. 1 and 3, the pipe 2 could be extracted from the ground 3 by a winch located in the excavation 8 and operating as a capstan. A further winch (such as the winch 4) could then be located above ground level to uncoil the pipe 1 from the capstan and provide the force to allow the pipe to be scored/stripped from the cable. It will be appreciated the pipe scoring/stripping could then be performed in any of the ways described above with appropriate modifications that will be apparent to the skilled man. In addition the various arrangements could be adapted for use with a linear winch.

In all of the above described embodiments of the invention, the pipe 1 may be scored to weaken its wall. The pipe may be scored rather than cut in order to avoid damaging the cable and/or pipe gripping means that may be distributed along the length of the cable 1. For instance, lead pipes commonly have a ½ inch or ¾ inch bore diameter and a wall thickness which typically varies from 4 mm to 6 mm. In this case the scoring incision is preferably set to a depth of about 4 mm so as to maximised the weakening of the pipe wall without cutting through the wall completely (although this may unavoidably happen in some places due to greater than average deviations in the wall thickness).

Although scoring is most likely to be preferable, depending on the nature of the cable, and in particular the manner in which the cable the engages the pipe, it may be acceptable, and even desirable, to cut the pipe rather than to score it. It will be appreciated that the present invention can be modified accordingly.

For instance, the splitter cone 6 could be fitted with blades to cut through the pipe wall in which case the scoring operation may be omitted. Similarly, an alternative form of splitter member incorporating cutting means could be used.

Other possible modifications to the method and apparatus according the present invention will be evident to the appropriately skilled person.

What is claimed is:

1. A method for removing a pipe from underground, the method comprising:

locating a pipe buried underground;

providing a flexible element having gripping means attached thereto;

inserting the flexible element and gripping means into the pipe in a first direction;

interconnecting the flexible element with a winch;

pulling the flexible element in a second direction generally opposite the first direction such that the gripping means couples the flexible element and pipe together;

drawing the flexible element and pipe from the ground together under the influence of the winch;

moving the flexible element and pipe through a separating means;

splitting the pipe along its length as it passes through the separating means; and stripping portions of the pipe from the flexible element after the pipe has been split.

2. A method according to claim 1, comprising the step of scoring the pipe along its length and splitting the pipe along one or more score lines to strip the pipe from the flexible element.

3. A method according to claim 1, wherein a winch is used to draw the flexible element and pipe past the separating means and the pipe is stripped from the flexible element upstream of the winch so that only the flexible element reaches the winch.

4. A method according to claim 3, wherein said winch provides the means for pulling the flexible element and pipe from the ground, the pipe being separated from the flexible element as it is pulled from the ground.

5. A method according to claim 4, wherein the flexible element/pipe emerges from the ground into an excavation from where it is directed to a point above ground level at which the winch is situated.

6. A method according to claim 4, wherein the pipe is scored and/or separated within the excavation before it is directed to the winch.

7. A method according to claim 3, wherein a wheel or roller is provided in the excavation to direct the flexible element/pipe towards the winch, the direction of the pipe changing as it is pulled around a part of the circumference of the wheel/roller by the winch/flexible element.

8. A method according to claim 1, wherein the splitting operation is performed by pulling the flexible element past a splitter member which bears against the internal wall of the pipe and forces the pipe in a direction away from the flexible element thereby causing the pipe to split.

9. A method according to claim 8, wherein the splitter member has portions on diametrically opposite sides of the flexible element so that opposite sides of the pipe are forced in opposite directions.

10. A method according to claim 9, wherein the splitter member is a tapered member through which the flexible element is pulled so that the pipe passes over the outside of the splitter member and is thereby forced to split apart.

11. A method according to claim 1, wherein a pair of knife edge wheels are used to score the pipe at diametrically opposed positions.

12. A method according to claim 11, wherein the wheels are supported by a mounting which is itself substantially fixed in position but which supports the wheels with freedom of translational movement to accommodate transverse deviation in motion of the pipe.

13. A method according to claim 1 wherein the pipe is made of lead.

14. Apparatus for removing a pipe from underground, the apparatus comprising:

a flexible element having gripping means attached thereto, said flexible element adapted to be inserted into an underground pipe, and said gripping means being adapted to couple said flexible element and pipe together;

a winch interconnected with said flexible element and actable to draw said flexible element and pipe together from the ground; and a separating means operatively positioned between said winch and said pipe, said separating means splitting and separating the pipe from said flexible element so that only said flexible element is wrapped onto said winch.

15. Apparatus according to claim 14, wherein said separating means includes scoring means for scoring the pipe along its length, and splitting means for splitting the pipe along the or each score line.

16. Apparatus according to claim 15, wherein the winch provides the means for pulling the flexible element and pipe from the ground.

* * * * *